United States Patent [19]

Laycak et al.

[11] 3,729,619
[45] Apr. 24, 1973

[54] APPARATUS FOR SURFACE INSPECTION OF MOVING MATERIAL WITH DEFECT TYPE RECOGNITION

[75] Inventors: John F. Laycak, W. Mifflin; Gerald J. Readal, O'Hara; Samuel B. Prellwitz, Wilkinsburg, all of Pa.

[73] Assignee: United States Steel Corporation, Pittsburgh, Pa.

[22] Filed: Mar. 4, 1971

[21] Appl. No.: 121,093

[52] U.S. Cl.........235/92 DN, 235/92 R, 235/92 CP, 235/92 CA, 235/92 V, 235/92 PE, 250/219 DF
[51] Int. Cl................................................G06m 7/00
[58] Field of Search................235/92 FQ, 92 DN, 235/92 PE, 92 PD, 92 V; 250/219 DF; 356/200, 237

[56] References Cited

UNITED STATES PATENTS

| | | |
|---|---|---|
| 3,560,096 | 2/1971 | Watson..........................250/219 DF |
| 3,160,741 | 12/1964 | Gottschall........................235/92 FQ |
| 3,591,776 | 7/1971 | Sylvester..........................235/92 DN |
| 3,280,692 | 10/1966 | Milnes................................356/200 |

Primary Examiner—Maynard R. Wilbur
Assistant Examiner—Robert F. Gnuse
Attorney—Rea C. Helm

[57] ABSTRACT

An inspection system for the surface of a strip of moving material where defects have a different appearance than the remainder of the strip. A plurality of photosensitive diodes positioned across the material detects defects periodically for a predetermined number of transverse scanning lines. Diode outputs are counted to give totals for area, length and maximum width of a defect in terms of scanning grids. A computer determines the defect shape, and therefore the type of defect, from the ratios between area, width, and length.

11 Claims, 3 Drawing Figures

INVENTORS.
JOHN F. LAYCAK,
SAMUEL B. PRELLWITZ &
GERALD J. READAL
By Rea C. Helm
Attorney

INVENTORS.
JOHN F. LAYCAK,
SAMUEL B. PRELLWITZ &
GERALD J. READAL

By Rea C. Helm

Attorney

APPARATUS FOR SURFACE INSPECTION OF MOVING MATERIAL WITH DEFECT TYPE RECOGNITION

This invention relates to apparatus for surface inspection of a moving sheet or strip of material where the imperfections of the surface have a different appearance than the remainder of the surface and more particularly, to the surface defects found in hot rolled steel strip or sheet.

Inspectors judge the quality of strip rolled on a hot strip mill by the presence of defects and their size, distribution, type, location and rate of occurrence and then weigh all these factors collectively against the intended end use of the strip. Visual inspection cannot be used at the high speed of modern processing lines. In addition, many defects of interest are out of range of visual inspection, or may be only observed in hazardous areas, or may not be readily visible, such as the underside of a fast moving strip where even mirrors are unsatisfactory. Present surface inspection devices provide the ability tO detect and count defects without attention to size and identification, and although closed circuit TV techniques are available to grade surface quality by assessing the severity and length of surface imperfections, there are no systems we are aware of which successfully detect and classify surface defects on a real time basis.

In accordance with our invention a plurality of photosensitive diodes detect defects periodically along a scanning line. The diode outputs are assembled into totals for area, length and width of a defect in terms of grid areas scanned for a predetermined length of strip. A digital computer then identifies the defect shape by the method explained in "A Digital Simulation of a Numerical Method for Classification of Geometric Shapes" by W. A. Kolb, Masters Thesis, University of Pittsburgh, 1968, in which shape is determined from the tolerances of the ratio of length to width and the ratio of area to length times width. These ratios identify geometric shapes, such as a circle which may be a pit, a rhombus or a rectangle with half circled ends which may be a slug or a gouge or a rectangle which may be rolled in scale. The shapes are determined immediately as well as the size and extent of the defect.

It is therefore an object of our invention to provide apparatus for automatic surface inspection of moving material.

Another object is to provide apparatus that indicates the type, size and extent of the defect.

A further object is to provide apparatus for detecting and reporting defects on a real time basis.

These and other objects will be more apparent after referring to the following specification and drawings in which.

Figure 1:
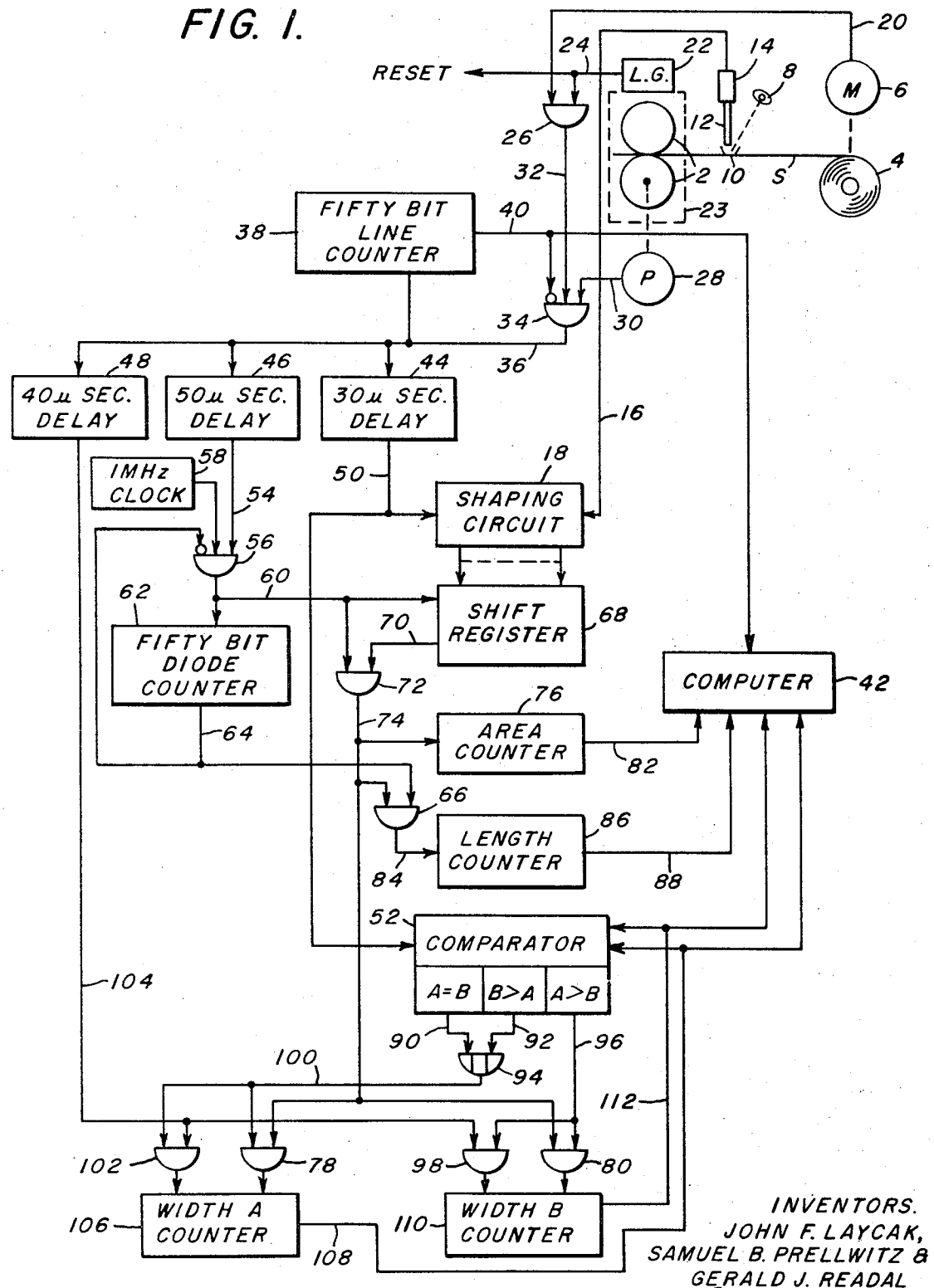
FIG. 1 is a schematic block of our diagram of the invention.
Figure 2:
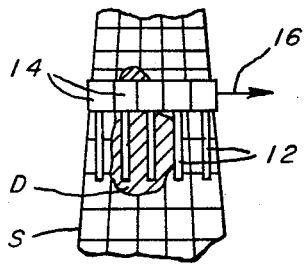
FIG. 2 is a partial perspective view illustrating the scanning apparatus of our invention.

Referring now to FIGS. 1 and 2, reference numeral 2 indicates the rolls of a finishing stand (not shown) of a conventional strip mill which is rolling strip S. The strip is coiled on a coiler 4 driven by a motor 6. A light source 8 is directed towards the strip S focusing a thin line of light 10 across the strip. A series of 50, five of which are shown in FIG. 2, fiber optic light pipes 12 are mounted with one end just above the strip S at the line of light 10 to pick up light reflections off the strip. At the other end of each pipe 12 is a photosensitive diode 14, each connected by line 16 to a shaping circuit 18. While fifty light pipes and diodes are used in our preferred embodiment, any number may be used depending on desired scanning grids and spacing requirements. Motor 6 provides a signal 20 to indicate the motor is under load and strip S is taut. A load cell 22 in the housing 23 for rolls 2 provides a signal 24 which indicates, by the pressure on rolls 2, that strip S is being rolled. Signals 20 and 24 are connected to inputs of an AND gate 26. A pulse generator 28 is connected to rolls 2 to provide a pulse output 30 for each increment of travel of strip S, in the preferred embodiment each 1/10 of an inch of strip travel. An output 32 of gate 26 and output 30 are connected to inputs of an AND gate 34. An output 36 of gate 34 is connected to a 50-bit line counter 38 which has an output 40 connected to an input to gate 34 and to an input of a conventional general purpose digital computer 42. Output 36 is also connected to an input of a 30 microsecond delay monostable multivibrator 44, an input of a 50 microsecond delay monostable multivibrator 46 and an input of a 40 microsecond delay monostable multivibrator 48. Multivibrator 44 has an output 50 connected to an input of a comparator 52 and to an input of shaping circuit 18. Multivibrator 46 has an output 54 connected to an input of an AND gate 56. A one megacycle clock 58 is also connected to an input of gate 56. Gate 56 has an output 60 connected to an input of a fifty-bit diode counter 62. Counter 62 has an output 64 connected to an input of gate 56 and an input of an AND gate 66. Output 60 is also connected to an input of a 50-bit shift register 68. Shift register 68 is connected to shaping circuit 18 and has an output 70 connected to an input of an AND gate 72. Output 60 is also connected to an input of AND gate 72. Gate 72 has an output 74 connected to an area counter 76, an input of gate 66, an input of an AND gate 78 and an input of an AND gate 80. Area counter 76 has an output 82 connected to an input of computer 42. Gate 66 has an output 84 connected to an input of a length counter 86 which has an output 88 connected to an input of computer 42. Comparator 52 has an output 90 and an output 92 connected to inputs of an OR gate 94. Comparator 52 also has an output 96 connected to an input of gate 80 and an input of an AND gate 98. Gate 94 has an output 100 connected to an input of gate 78 and an input of an AND gate 102. Multivibrator 48 has an output 104 connected to an input of gate 98 and an input of gate 102. Outputs of gates 78 and 102 are connected to inputs of a width counter (A) 106. Counter 106 has an output 108 connected to an input of computer 42 and an input of comparator 52. Outputs of gates 80 and 98 are connected to inputs of a width counter (B) 110 which has an output 112 connected to an input of computer 42 and an input of comparator 52.

Figure 3:
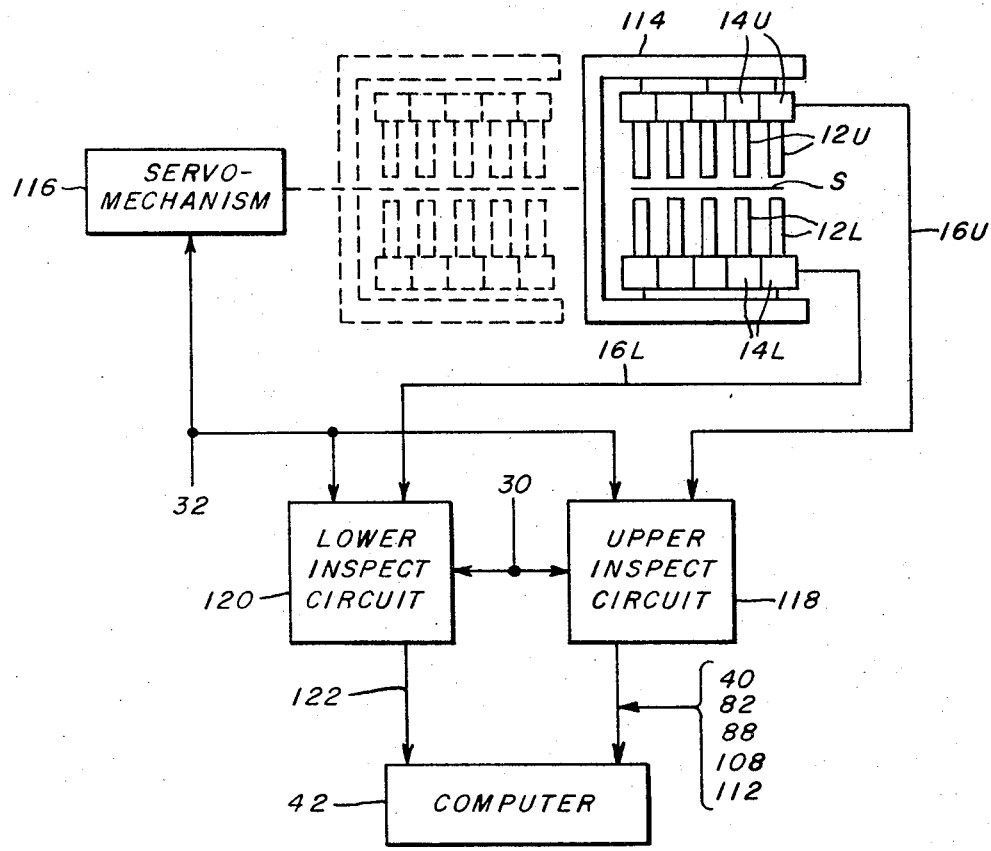
FIG. 3 is a schematic cross-sectional view showing inspection of both sides of material.

FIG. 3 shows the inspection system adapted to inspect both sides of the strip S. Fiber optic light pipes 12U, five of which are shown, direct light reflected from the upper side of the strip to corresponding photosensitive diodes 14U. Another set of fiber optic light pipes, 12L, five of which are shown, direct light reflected from the lower side of the strip to corresponding photosensitive diodes 14L. The photosensitive diodes 14U and 14L, the fiber optic light pipes 12U and 12L together with an upper and a lower light source (not shown) are mounted on a C frame 114. C frame 114 is movable between the position shown by dotted lines and the position shown by solid lines by a servo-mechanism 116. Output 32 is connected to an input of servo-mechanism 116. Photosensitive diodes 14U have an output 16U connected to inputs of an upper inspect circuit 118 which includes the circuitry as shown in FIG. 1 from gate 26 through the 50-bit line counter 38, area counter 76, length counter 86 and width counters 106 and 110 providing outputs 40, 82, 88, 108 and 112 connected to inputs of computer 42. Outputs 16L of photosensitive diodes 14L are connected to inputs of a lower inspect circuit 120, similar to circuit 118, which provides an output 122, corresponding to outputs 40, 82, 88, 108, and 112 of circuit 118, connected to inputs of computer 42.

In operation, referring to FIGS. 1 and 2, strip S is fed through rolls 2 and coiled into coiler 4. The load on rolls 2 activates load cell 22 sending signal 24 to gate 26. When motor 6 tightens the strip S, signal 20 is sent to gate 26, output 32 is established. When signal 24 is first initiated, all counters are reset to zero and the output 40 of counter 38 removes the inhibit from gate 34, and scanning may begin. With light source 8 providing illumination line 10, diodes 14 then provide outputs to shaping circuit 18 when a defect D (FIG. 2) in the surface of the sheet passes the light pipes 12. The spacing of the diodes 14 and light pipes 12 is such to provide increments of width in the preferred embodiment of one-tenth of an inch. Pulse generator 28 provides pulses which are increments of travel of strip S preferably one-tenth of an inch so that a scanning grid as shown in FIG. 2 is created. While the 50 light pipes at 1/10 inch spacing results in a field of view of five inches, the field of view could obviously be made smaller or larger by changing the number or spacing of the light pipes and diodes, or several fields of view could be provided with additional sets of diodes, light pipes and associated circuitry.

Pulses from pulse generator 28 pass through gate 34 enabled by output 32 of gate 26 and output 40 of counter 38. Thirty microseconds later multivibrator 44 provides an output 50 to comparator 52 and shaping circuit 18. The condition of diodes 14 at this time are transferred in parallel from shaping circuit 18 into shift register 68. The shift register will then have a binary 0 corresponding to each diode that receives maximum light and a binary 1 corresponding to each diode that is illuminated below its threshold intensity, an indication of a defect. The binary 0 and binary 1 designations could obviously be reversed with appropriate circuitry changes. Comparator 52 is triggered on to compare the outputs of width counters 106 and 110. Since both width counters initially are zero for the first pulse from generator 28 and therefore equal each other, output 90 of comparator 52 goes through gate 94 enabling gates 102 and 78. Forty microseconds after the first pulse of pulse generator 28, multivibrator 48 provides output 104 to reset counter 106 through gate 102 to zero and provides a pulse to gate 98 which is not used because gate 98 is not enabled.

Fifty microseconds later multivibrator 46 provides a pulse output 54 enabling gate 56 so that pulses from clock 58 may pass to shift register 68, enable gate 72 and count in counter 62. The clock pulses shift the diode outputs out of shift register 68 through gate 72 to counter 76 and gates 66, 78 and 80. Counters 76 and 106 then record the number of diode outputs which is the number of diodes indicating a defect for that scan line. When counter 62 reaches a count of fifty which is equal to the number of diodes in the array 14, output 64 inhibits gate 56 and the count stops in counters 76 and 106. If gate 66 has been enabled by a diode defect output 74, pulse output 64 then passes through gate 66 to record a one in counter 86. Thus, for the first pulse from pulse generator 28, there will be a count in counter 76 (area) corresponding to the number of scanning grids as shown in FIG. 2 in which a defect was detected, the same count in counter 106 (width) and a count of one in counter 86 (length) provided there was any count placed in the counters 76 and 106. The output of gate 34 also places a single count into counter 38. The outputs of counters 106 and 110 are fed back into the comparator 52.

As the strip continues to move, the outputs of diodes 14 will change depending upon the nature and extent of the defect. These outputs are held in shaping circuit 18. When the second pulse of pulse generator 28 occurs, another count is added to counter 38 and after a 30 microsecond delay, output 50 again transfers shaping circuit 18 inputs into shift register 68 and comparator 52 compares the totals in counters 106 and 110. Assuming that there was a defect in the previous scan, there would now be a count in counter 106, but not in counter 110. Comparator 52 would then have an output 96 which would enable gate 80 and gate 98 and disable gates 78 and 102. The total for the first scan would remain in counter 106. 40 microseconds later multivibrator 48 provides output 104 to reset counter 110 to zero through gate 98. Fifty microseconds later the diode outputs are shifted out of the shift register 68 with defect outputs going into area counter 76 in addition to the count from the previous pulse 30, and into counter 110 through gate 80. Counter 62 provides the inhibit pulse to gate 56, and assuming a defect, a single count to add to the count in counter 86. The circuit is now ready for a third pulse from pulse generator 28. The process just described is repeated with comparator 52 and its associated gates resetting to zero the counter 106 or 110 which has the lesser count and retaining the count in the counter with the higher count. Thus one width counter will always have a count representative of the maximum defect width.

When counter 38 has reached a count of fifty, representative of 5 inches of travel of strip S, it supplies a pulse output 40 inhibiting gate 34. It also actuates a pulse to computer 42 to begin the computations. Computer 42 then determines the ratio of area counter 76 to the product of length counter 86 and the greater of width counters 106 and 110. This ratio determines the general geometric shape of the defect and thus the nature of the defect. In addition, the ratio of the count in length counter 86 to the greater of width counters 106 and 110 further helps identify the geometric shape of the defect and accordingly, the nature of the defect. The output of computer 42 for each 5 inches of length of travel of strip S may be printed out or displayed and repeats for each five inches of length of travel of the strip.

While our invention has been described and shown with a light source 8 providing a thin line of light 10 on the surface of the strip, any type of electromagnetic radiation could be used provided a sensor can detect the desired differences in the surface of the strip. In a hot strip, the strip itself may provide sufficient radiation for detection purposes without any additional radiation source. By using more than one sensitivity level for the sensors, or by using sensors affected by different wave lengths, different levels or types of defects may be detected.

In FIG. 3, provision is made for inspecting both sides of a strip simultaneously by duplicating the necessary circuitry. Computer 42 has the additional capability of handling both inspections simultaneously and correlating the results for the same increment of length of strip S. The movable C frame is provided to minimize damages from cobbles during start-up, and, as long as gate 26 provides signal 32, frame 114 will be in operating position. As soon as signal 32 stops, servomechanism 116 will move frame 114 to the dotted line position, away from potential damage.

We claim:

1. Apparatus for determining the shape of surface defects on moving material comprising a first plurality of spaced apart detectors located along a line at an angle to the direction of travel of the material with each detector providing a first output when a surface defect is detected, means for providing a pulse for each movement of the material a predetermined distance, a first counting means connected to said means for providing a pulse for counting a predetermined number of pulses, a second counting means responsive to the occurrence of each pulse and connected to said first plurality of detectors, said first counting means and said means for providing a pulse for counting the number of said first outputs upon the occurrence of each pulse for said predetermined number of pulses, a third counting means responsive to the occurrence of each pulse and connected to said first plurality of detectors, said first counting means and said means for providing a pulse for counting those pulses during which there is a first output for said predetermined number of pulses, a fourth counting means responsive to the occurrence of each pulse and connected to said first plurality of detectors, said first counting means and said means for providing a pulse for counting the maximum number of said first outputs upon the occurrence of a pulse for said predetermined number of pulses, and means responsive to the last of the predetermined number of pulses and connected to said first, second, third and fourth counting means for determining the ratio of the count in said second counting means to the product of the count in said third counting means and said fourth counting means.

2. Apparatus according to claim 1 in which said means for determining ratio includes means for determining the ratio of the count in the third counting means to the count in the fourth counting means.

3. Apparatus according to claim 1 in which said material is a source of radiation and said first plurality of detectors is responsive to the radiation from said material.

4. Apparatus according to claim 1 which includes a source of electromagnetic radiation located to direct said electromagnetic radiation onto the surface of said material and said first plurality detectors is located to receive said electromagnetic radiation reflected from said material.

5. Apparatus according to claim 4 in which said first plurality of detectors includes a first group of detectors responsive to a first wave length band of said electromagnetic radiation and a second group of detectors responsive to a second wave length band of said electromagnetic radiation.

6. Apparatus according to claim 4 in which said source of electromagnetic radiation is light and each detector includes a fiber optic light pipe with one end near the surface of said material and a photosensitive diode at the other end of the light pipe and which includes circuit means connected to said diodes for providing said first outputs, each one associated with a diode when light reflected from said surface and passed through the associated light pipe is below the diode threshold intensity.

7. Apparatus according to claim 1 in which said second counting means includes a shift register connected to receive said first outputs from said first plurality of detectors, means connected to said means for providing a pulse and responsive to the occurrence of a pulse for transferring said first outputs into said shift register, a first delay means connected to said means for providing a pulse and responsive to the occurrence of a pulse for providing a first delay pulse, a clock pulse source, means connected to said first delay means, said shift register and said clock pulse source and responsive to the occurrence of a first delayed pulse for shifting said first outputs out of said shift register, a first counter and a first gating means connected to said clock pulse source and said shift register for connecting said first outputs from said shift register into said first counter.

8. Apparatus according to claim 7 in which the fourth counting means includes a second counter, a third counter, a comparator connected to the second and third counters and to said means for providing a pulse and responsive to the occurrence of a pulse for comparing the counts in the second and third counters, a second delay means connected to said means for providing a pulse and responsive to the occurrence of a pulse for providing a second delayed pulse occurring before the first delayed pulse and a second gating means connected to said comparator, said shift register, said second delay means and said second and third counters and responsive to the occurrence of said second delayed pulse for retaining in one counter the larger of the counts in the second and third counters while resetting the other counter to zero and enabling the other counter to receive said first outputs from the shift register upon the occurrence of the next first delayed pulse and, when the count in the second counter equals the count in the third counter, for retaining the count in one counter and resetting the other counter to zero and enabling the other counter to receive said first outputs from the shift register upon the occurrence of the next first delayed pulse.

9. Apparatus according to claim 1 in which said material is a sheet and which includes a second plurality of optical detectors with each detector providing a second output when a surface defect is detected on the other side of said sheet, a fifth counting means responsive to the occurrence of each pulse and connected to said second plurality of detectors, said means for providing a pulse and said first counting means for counting the number of said second outputs upon the occurrence of each pulse for said predetermined number of pulses, a sixth counting means responsive to the occurrence of each pulse and connected to said second plurality of detectors, said first counting means and said means for providing a pulse for counting those pulses during which there is a second output for said predetermined number of pulses and a seventh counting means responsive to the occurrence of each pulse and connected to said second plurality of detectors, said first counting means and said means for providing a pulse for counting the maximum number of said second outputs upon the occurrence of a pulse for said predetermined number of pulses.

10. Apparatus according to claim 9 which includes means responsive to the last of said predetermined number of pulses and connected to said first, fifth, sixth and seventh counting means for determining the ratio of the count in said fifth counting means to the product of the count in said sixth counting means and said seventh counting means and the ratio of the count in said sixth counting means to the count in said seventh counting means.

11. Apparatus according to claim 9 which includes a movable C frame for holding said first and second plurality of detectors and means responsive to production process conditions for moving said C frame to a position for inspecting and for beginning inspection.

* * * * *